(12) United States Patent
Barash et al.

(10) Patent No.: US 11,204,858 B1
(45) Date of Patent: Dec. 21, 2021

(54) SYSTEMS AND METHODS FOR PROVIDING CODE COVERAGE ASSESSMENTS DURING FULL SYSTEM SIMULATIONS

(71) Applicant: Amazon Technologies, Inc., Seattle, WA (US)

(72) Inventors: Benjamin Jack Barash, Seattle, WA (US); Daniel C. Wang, Kirkland, WA (US); Benjamin William Hamming, Seattle, WA (US); Alex Wilson Nash, Bellevue, WA (US); Maksim Tsikhanovich, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/001,298

(22) Filed: Aug. 24, 2020

(51) Int. Cl.
*G06F 11/36* (2006.01)
*G06F 8/71* (2018.01)

(52) U.S. Cl.
CPC .......... *G06F 11/3676* (2013.01); *G06F 8/71* (2013.01); *G06F 11/3664* (2013.01); *G06F 11/3688* (2013.01)

(58) Field of Classification Search
None
See application file for complete search history.

(56) References Cited

U.S. PATENT DOCUMENTS

| 2005/0160405 | A1* | 7/2005 | Lunia | G06F 11/3676 717/124 |
| 2010/0235809 | A1* | 9/2010 | Rath | G06F 8/20 717/105 |
| 2011/0197098 | A1* | 8/2011 | Sobolev | G06F 11/3676 714/38.1 |
| 2020/0065234 | A1* | 2/2020 | Letombe | G06F 11/3684 |
| 2020/0379886 | A1* | 12/2020 | Potter | G06F 11/3676 |

OTHER PUBLICATIONS

Dai, "Unified Simulation and Test Platform for Control Systems of Unmanned Vehicles", 2019, eess.SY (Year: 2019).*
Kapinski, "Simulation-Based Approaches for Verification of Embedded Control Systems", 2016, IEEE (Year: 2016).*

* cited by examiner

*Primary Examiner* — Hossain M Morshed
(74) *Attorney, Agent, or Firm* — Athorus, PLLC

(57) ABSTRACT

Described are automated systems and methods for providing a simulated environment for robotic and/or real-time systems, such as unmanned vehicles, to perform full system simulations while also providing a system-wide code coverage assessment of the software associated with the robotic and/or real-time systems. The exemplary systems and methods can employ code coverage instrumented shared libraries to facilitate generation of code coverage information and one or more code coverage reports. The code coverage information and/or the code coverage report can quantify the effectiveness of the testing and can facilitate development of more comprehensive and efficient testing of the software.

20 Claims, 11 Drawing Sheets

SYSTEMS AND METHODS FOR PROVIDING CODE COVERAGE ASSESSMENTS DURING FULL SYSTEM SIMULATIONS

BACKGROUND

Software testing is typically an essential part of the software development process. Testing can ensure functionality, compatibility, etc., and can also facilitate optimization of software, as well as identification of errors and defects in the software. In performing software testing, code coverage assessments can be employed to assess test coverage to determine how the code is being exercised during testing. For example, code coverage can provide metrics that can facilitate an understanding of which portions of the code may have been exercised during testing and which portions of the code may not have been executed during the testing. Code coverage testing is often performed on individualized unit tests that typically specifically target one or more discrete packages and algorithms.

Figure 1:
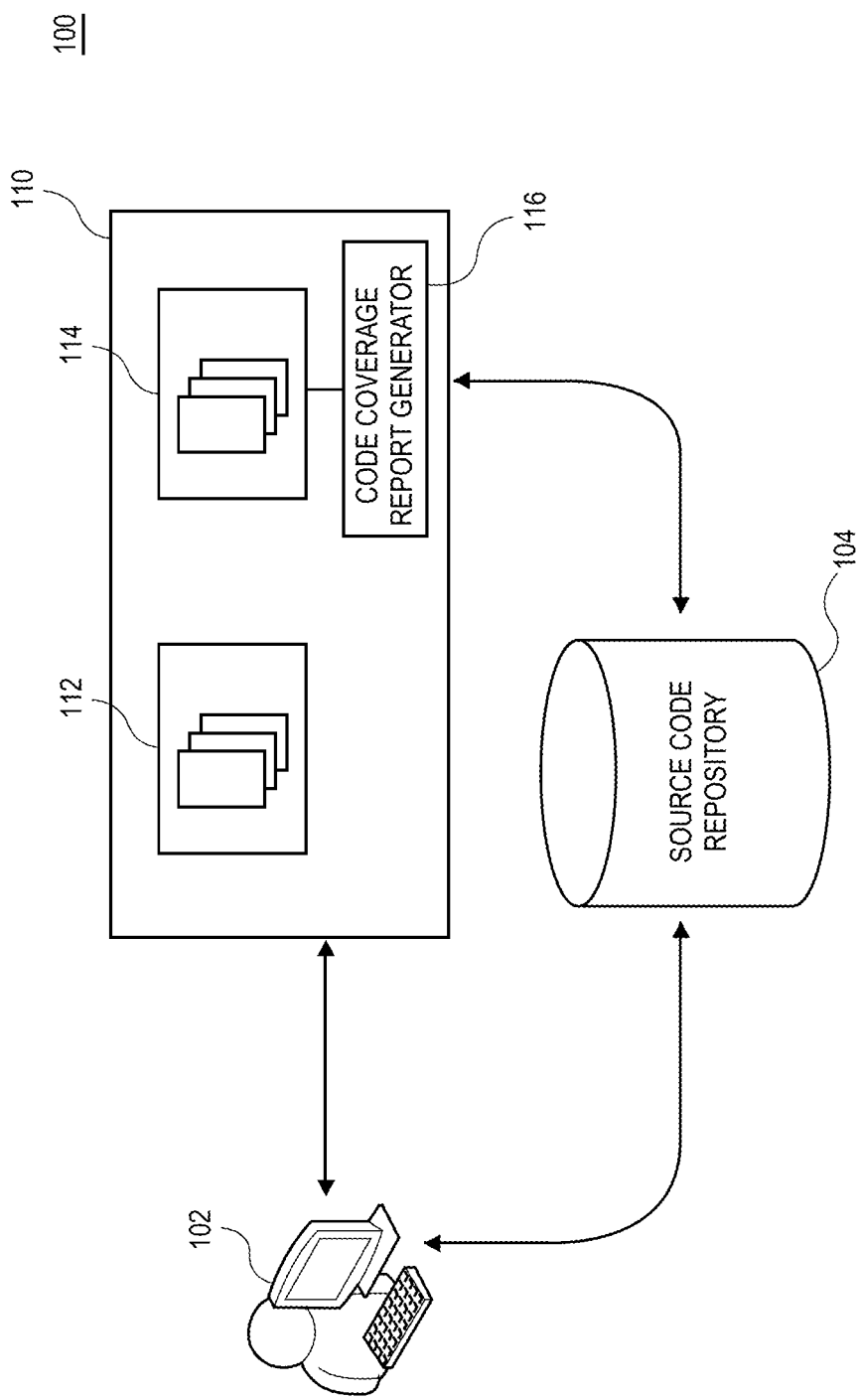
FIG. 1 is a block diagram illustrating an exemplary computing system, in accordance with embodiments of the present disclosure.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

As is set forth in greater detail below, embodiments of the present disclosure are generally directed to systems and methods for providing a simulated environment for robotic and/or real-time systems, such as unmanned vehicles, to perform full system simulations while also providing a system-wide code coverage assessment of the software associated with the robotic and/or real-time systems. This can provide insight into how effectively the simulated environment is exercising and testing the source code for the robotic system. Accordingly, embodiments of the present disclosure can provide code coverage assessment of software while the software is being exercised and tested during simulated operation of robotic systems in a safe, simulated environment prior to, or in addition to, real-world testing and operation of such robotic systems. The exemplary systems and methods can also generate and provide a code coverage report, which can include various metrics associated with the proportion of the source code executed by the simulations. This can facilitate quantifying the effectiveness of the testing performed by the simulations. Accordingly, embodiments of the present disclosure can be utilized during the software development process (e.g., during development, during the software release process, etc.) to determine the effectiveness of the testing of the source code during simulations.

Embodiments of the present disclosure can provide exemplary systems and methods that can provide a simulated environment in which the full system operation of certain robotic systems, such as unmanned aerial vehicles, unmanned ground vehicles, etc. can be simulated. The simulations can test and exercise the source code of the robotic systems prior to, or in addition to, real-world testing and/or operation of the robotic systems. The exemplary systems and methods can include, for example, a code coverage mode, which, when selected, can enable a flag to indicate that the simulations are to be performed in code coverage mode. Enabling the code coverage mode flag can instruct the exemplary systems and methods to load code coverage instrumented shared libraries in place of the standard libraries. The code coverage instrumented shared libraries can include various objects and/or directives that can facilitate identification of the portions of the source code that are, and are not, executed during the simulations. Accordingly, performing a simulation with these code coverage instrumented shared libraries can facilitate obtaining code coverage data and/or information associated with the source code after the simulation has been completed.

According to certain aspects of the present disclosure, the code coverage data and/or information obtained from a plurality of simulations can be aggregated to provide a more comprehensive code coverage assessment. For example, code coverage information and/or data from individual unit tests (e.g., testing for one or more individual packages), as well as hardware tests and simulations (e.g., hardware-in-the-loop, etc.), can be aggregated with code coverage data and/or information from local testing and/or large-scale testing (e.g., local and/or distributed large-scale testing scenarios, etc.) to further augment the code coverage data and/or information. Accordingly, aggregation of the code coverage data and/or information from multiple test sources, as well as performing the code coverage on a full-system simulation of the robotic system can facilitate obtaining an overall "bird's eye view" of the code coverage of all the source code.

The code coverage data and/or information can then be processed to generate a code coverage report identifying the portions of the source code that were executed, as well as portions of the source code that were not executed, during the simulations, as well as providing metrics to provide an assessment of the code coverage. For example, the code coverage reports can indicate the portions of the source code that were executed as a percentage, fraction, graphical representation, etc. These metrics can be presented with varying levels of granularity. For example, the percentages can be shown as an overall percentage of the source code executed by directory, file, function, line, branch, etc. Certain aspects of the present disclosure can also provide an overall code coverage score, so as to quantify the overall code coverage as a single quantifiable value.

The code coverage reports can facilitate identification of gaps in the testing and simulation of the source code. For example, code coverage reports can indicate which portions of source code were and/or were not executed or run by the simulations performed in the simulated environment. This can indicate where gaps in test coverage may exist and can facilitate more comprehensive testing of the source code. For example, the gaps in coverage can facilitate development of additional test cases and additional test scenarios to more fully exercise and test the portions of source code that were not executed during the simulations. Additionally, the code coverage assessment can also improve testing efficiency. For example, based on the code coverage assessment, redundant and duplicative test cases and scenarios that provide overlapping coverage can be eliminated so that the test cases and scenarios can be more targeted and the number test cases can be reduced (e.g., obtain the same test coverage from 500 test cases when 5,000 test cases were previously performed to obtain the same coverage, etc.).

According to certain exemplary embodiments of the present disclosure, the robotic systems that can be simulated and tested can include an unmanned aerial vehicle (UAV), and the simulated environment can facilitate simulation of missions that may be carried out by the UAV. For example, the UAV may conduct missions in connection with delivering packages and other items. Accordingly, the simulated missions may include performing delivery of the packages and/or items in the simulated environment, and a code coverage assessment of the source code can be performed while the simulated missions are being performed in the simulated environment. The code coverage assessments can provide code coverage data and/or information, which can then be utilized to generate code coverage reports.

According to another exemplary embodiment of the present disclosure, a code coverage assessment of the source code of a robotic system, such as a UAV, can be performed using data and/or information from an actual flight or mission of the UAV. For example, flight logs, data, and/or other information associated with an actual flight of a UAV can be obtained from the UAV after the UAV has performed the flight. The flight logs, data, and/or other information concerning the flight can be processed to extract a sequence of each event, command, instruction, etc. encountered during the flight. The sequence of events can be utilized to reconstruct the actual flight of the UAV, and the reconstructed flight can be simulated using the code coverage instrumented shared libraries to obtain a code coverage assessment of the source code of the UAV while a simulation of the reconstructed flight is performed. According to certain aspects of the present disclosure, code coverage assessments can be performed on a plurality of simulated flights that were reconstructed based on flight data and/or information from a plurality of actual flights or missions of a UAV. For example, the extraction of flight logs, data, and/or other information associated with an actual flight of a UAV can be automatically performed at the completion of each flight and/or mission of one or more UAVs (e.g., for a fleet of UAVs, etc.), and a code coverage assessment can be performed on simulated reconstructions of each actual flight and/or mission. The code coverage data and/or information associated with the simulations of the actual flights and/or missions can then be aggregated. The code coverage data and/or information can then be used to generate code coverage reports associated with the simulation of the one or more actual flights.

The reconstruction, simulation, and code coverage assessment of an actual flight can also be useful in accident reconstructions. In such instances, flight logs from a UAV that has suffered an accident can be processed to reconstruct each event encountered by the UAV. The code coverage assessment may then be utilized to identify "bad" code that may have been the cause of or contributed to the accident. Similar to the code coverage assessment obtained through the simulations in the simulated environments, the flight logs, data, and/or information can be obtained for multiple flights. The flight logs, data, and/or information for the various flights can facilitate reconstruction of the flights, and code coverage assessments can be performed for all of the various reconstructed flights as the reconstructed flights are simulated. These code coverage assessments can also be aggregated to generate code coverage reports encompassing all of the multiple flights for which code coverage assessments were performed.

Although embodiments of the present disclosure are primarily described with respect to UAVs, embodiments of the present disclosure can be applicable to other any other types of vehicles, robotic systems, real-time systems, etc. that can benefit from performing a code coverage assessment while having its source code tested and exercised through simulations in a simulated environment. For example, unmanned aerial vehicles, ground based vehicles, autonomous ground based vehicles, water based vehicles, unmanned water based vehicles, other robotic systems, etc. may benefit from embodiments of the present disclosure. Additionally, embodiments of the present disclosure can also be applicable to machine learning systems to assess the operation of a predictive machine learning model, and which nodes of the machine learning may have been utilized in generating its predictions.

FIG. 1 is a block diagram of an exemplary computing system 100 that may perform or provide the exemplary systems and methods according to embodiments of the present disclosure. As shown in FIG. 1, computing system 100 can include simulation system 110, source code repository 104, and client device 102. Computing system 100 may form a portion of a network-accessible computing platform implemented as a computing infrastructure of processors, storage, software, data access, and other components that is maintained and accessible via a network, such as the Internet.

Users can interact, via client device 102, with simulation system 110, and, to perform the simulations and the code coverage assessments, simulation system 110 can include standard libraries 112, code coverage instrumented shared libraries 114, and code coverage report generator 116. Simulation system 110 can include one or more computing systems, may be arranged in any number of ways, and can provide local, remote, and/or large-scale distributed testing and/or simulation environments. Further, source code repository 104 can be accessed by both client device 102 and simulation system 110.

As described herein, simulation system 110 can include various computing systems that can generate and provide a simulated environment for the testing and exercising of source code (e.g., stored by source code repository 104) associated with robotic systems, such as a UAV, as well as providing a code coverage assessment of the source code while performing the simulations. For example, simulation system 110 can provide a simulated environment in which a UAV may fly simulated missions to test, verify, and validate the operation of the source code associated with the UAV. Preferably, the simulations performed are full system-wide simulations intended to comprehensively test all the algorithms and source code underpinning all the subsystems and components of the UAV.

Simulation system 110 can also provide code coverage assessments of the source code as the source code is being tested and exercised by the simulated environment created by simulation system 110. Accordingly, prior to performing a simulation, a flag can be set or enabled to instruct simulation system 110 to perform simulations in the simulated environment in code coverage mode. In code coverage mode, code coverage instrumented shared libraries 114 can be loaded in place of standard libraries 112 to facilitate performing a code coverage assessment of the source code while performing the simulations of the UAV in the simulated environment. According to certain exemplary embodiments, code coverage instrumented shared libraries may have been generated by a compiler at compile-time to insert directives and/or objects such that the execution of each line of code can be counted and logged to provide code coverage data and/or information. Accordingly, as the simulation is being performed, the inserted instrumented directives and/or objects can provide an indication of each function, line, branch, etc. of source code executed during the simulation. The code coverage data and/or information can include this indication of the executed portions, and the non-executed portions, of the source code. After the simulation is completed, simulation system 110 can generate a code coverage report (e.g., by code coverage report generator 116) based on the indications of which function, line, branch, etc. were executed. The code coverage report may summarize and quantify the code coverage (e.g., the proportion of the source code that was executed) that was provided by the simulation that was performed.

In addition to code coverage reports, the code coverage data and/or information can be utilized to provide additional information regarding the execution of the source code that was performed during simulation of the vehicle. For example, it may be expected that certain portions of the source code should not be executed (e.g., deactivated code, etc.) during operation of the robotic system. Accordingly, based on the code coverage data and/or information, simulation system 110 can provide an alert that portions of source code that were not expected to be executed were indeed executed during a simulation of the robotic system. The alert can be provided as a visual, audible, tactile, etc. indicator to client device 102, or can be included in one or more code coverage reports generated from the code coverage data and/or information.

According to aspects of the present disclosure, simulation system 110 can attempt to recreate real-world operations, scenarios, events, emergencies, etc. in the simulated environment in an attempt to test and exercise the source code underpinning the operation of the UAV. For example, in implementations where the UAV may be deployed to deliver packages, simulation system 110 can create a simulated environment in which the UAV can perform simulated missions of delivering packages. According to certain aspects, in the simulated environment created by simulation system 110, the UAV may simulate a mission, which may include, receiving a payload package to be delivered at a facility (e.g., warehouse, fulfillment center, etc.), taking off from the facility, flying to the delivery destination, delivering the package at the delivery destination, flying back to the same or other facility, and landing at the facility. Additionally, the simulated environment can include the facility from which the UAV receives a package to be delivered, and delivery destination, various structures (e.g., homes, buildings, water towers, etc.), weather conditions (e.g., wind, rain, snow, fog, etc.), environmental features (e.g., mountains, trees, etc.), as well as other features, structures, and/or events that may be encountered on a mission. Optionally, the UAV may, during the simulated mission, deliver more than one package to one or more delivery destination.

During the simulated mission, various test cases and scenarios can be presented to test and exercise the source code underpinning the various systems (e.g., the navigation system, object sensing system, etc.) of the UAV. According to certain aspects of the present disclosure, this can include routine missions where everything goes as expected. Additionally, simulations can include unexpected test cases. For example, unexpected obstacles (e.g., birds, another UAV, other aircraft, etc.), adverse weather conditions (e.g., rain, snow, wind, etc.), obstacles that may be difficult to detect (e.g., power lines, etc.), unexpected hazards (e.g., a person at the delivery destination, other obstacles, etc.) failure of various components and/or systems of the UAV (e.g., navigation, sensors, communications, etc.) or other faults, or any other test scenarios that may be desired can be introduced during the simulated operation of the UAV. Other scenarios and test cases may also be implemented based on the mission of the UAV being tested and may also be further customized and tailored to the mission of the UAV.

Additionally, in situations where the code coverage mode has been selected, simulation system 110 can also perform a code coverage assessment of the source code associated with the UAV to ascertain the extent to which the source code is being tested during the simulations performed in the simulated environment. In code coverage mode, simulation system 110 can keep track of and/or log the lines of source code that are executed while the simulation is being performed. According to certain aspects of the present disclosure, simulation system 110 may also log when the lines of the source code were executed during the simulation such that execution of each line of the source code can be correlated to an event and/or a test case presented in the simulation. Accordingly, code coverage mode can facilitate determination of the portions of the source code that were exercised and tested by simulation system 110 during the simulation of the mission. Once the simulation is completed, the code coverage data and/or information can be compiled to generate a code coverage report. The code coverage report can identify additional test coverage that may be desired by indicating which portions of the source code were not executed by the simulations.

According to certain aspects, the simulations can be performed locally (e.g., at client device 102) by a user (e.g., a software developer). Alternatively, the simulations can be performed, for example, in batch in a large-scale distributed arrangement. Regardless of how the simulations are performed, code coverage data and/or information from one or more simulations can be aggregated into one or more code coverage reports. According to other aspects, code coverage data and/or information from unit tests for individual packages and/or hardware tests and simulations can also be aggregated with code coverage data and/or information from one or more simulations into one or more code coverage reports.

Figure 2A:
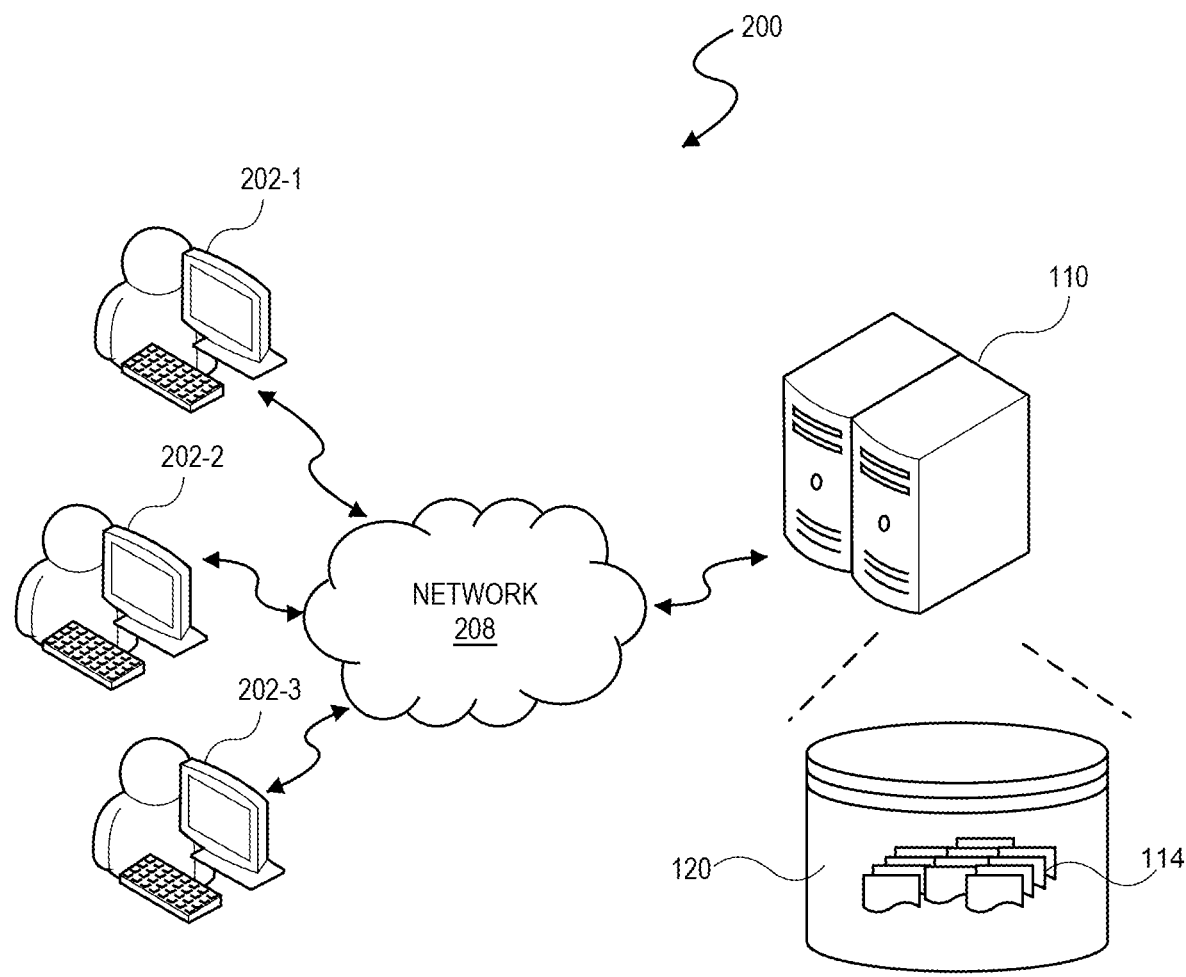
FIGS. 2A and 2B are block diagrams illustrating exemplary network environments for implementing embodiments of the present disclosure.

FIG. 2A shows an exemplary system 200 according to embodiments of the present disclosure. As shown in FIG. 2A, users (e.g., software developers, etc.) can access, via client devices 202-1, 202-2, and 202-3, simulation system 110 via network 208. For example, each of the users can interact with simulation system 110 via applications executed on client devices 202-1, 202-2, and 202-3 through network 208. Client devices 202-1, 202-2, and 202-3 can be any type of computing device, such as a smartphone, tablet, laptop computer, desktop computer, workstation, wearable, etc.

As will be appreciated by those skilled in the art, network 208 can include a telecommunication network over which computing devices and network enabled processes and/or services may communicate and/or exchange data. By way of illustration, a computer network, such as network 208 may include any of a local area network or LAN, a wide area network or WAN, or combinations thereof. According to various implementations of the disclosed subject matter, the network 208 may comprise the Internet. As those skilled in the art will appreciate, the Internet may include a global system of interconnected computer networks that use a defined protocol suite to link devices (including computers) worldwide. Additionally, the Internet can be understood to include a network of networks that consists of private, public, academic, business, and government networks of varying scope and size, linked by a broad array of electronic, wireless, and optical networking technologies. According to aspects of the disclosed subject matter, the personal computing devices, including user client devices 202-1, 202-2, and 202-3, as well as simulation system 110, can communicate with the network 208 by way of a wired connection, a wireless connection, an optical connection, or any combination of these.

As shown in FIG. 2A, simulation system 110 can include data store 120, which can include various files, data, information, instructions, programs, etc. that can facilitate the simulations performed in the simulated environment, as well as performing the code coverage assessment of the source code as the simulations are performed. In addition to the various files, data, information, instructions, programs, etc., data store 120 can also include code coverage instrumented shared libraries 114, which can be loaded when the simulations are to be run in code coverage mode.

Exemplary system 200 may represent a system by which the exemplary systems and/or methods according to embodiments of the present disclosure may be implemented. For example, users may access simulation system 110 to perform simulations and code coverage assessments of source code via client devices 202-1, 202-2, and/or 202-3. The users may include software developers, and as revisions, changes, etc. to the source code are checked-in, simulations to exercise the checked-in source code may automatically be performed to test and exercise the revised source code. According to certain aspects, such simulations and code coverage assessments may be performed automatically as part of verification and validation of the software (e.g., as a requirement prior to release, etc.).

As described herein, the simulations can be performed locally or remotely, and may be initiated by users via any of client devices 202-1, 202-2, and/or 202-3. For example, each of the users associated with client devices 202-1, 202-2, and/or 202-3 can initiate simulations and/or code coverage assessments individually, in parallel, serially, etc. Additionally, users may, for example, perform unit test simulations and code coverage assessments for one or more individual software packages, and may provide the code coverage data and/or information obtained from the unit test simulations to simulation system 110 so that the code coverage data and/or information may be aggregated with other code coverage data and/or information prior to the generation of one or more code coverage reports. Alternatively and/or in addition, users may also perform code coverage assessments while performing hardware tests and simulations (e.g., hardware in the loop testing, etc.), and may provide the code coverage data and/or information obtained from the hardware tests and simulations to simulation system 110 so that the code coverage data and/or information may be aggregated with other code coverage data and/or information prior to the generation of one or more code coverage reports. Accordingly, simulation system 110 can facilitate simultaneously performing simulations and code coverage assessments of the source code.

Figure 2B:
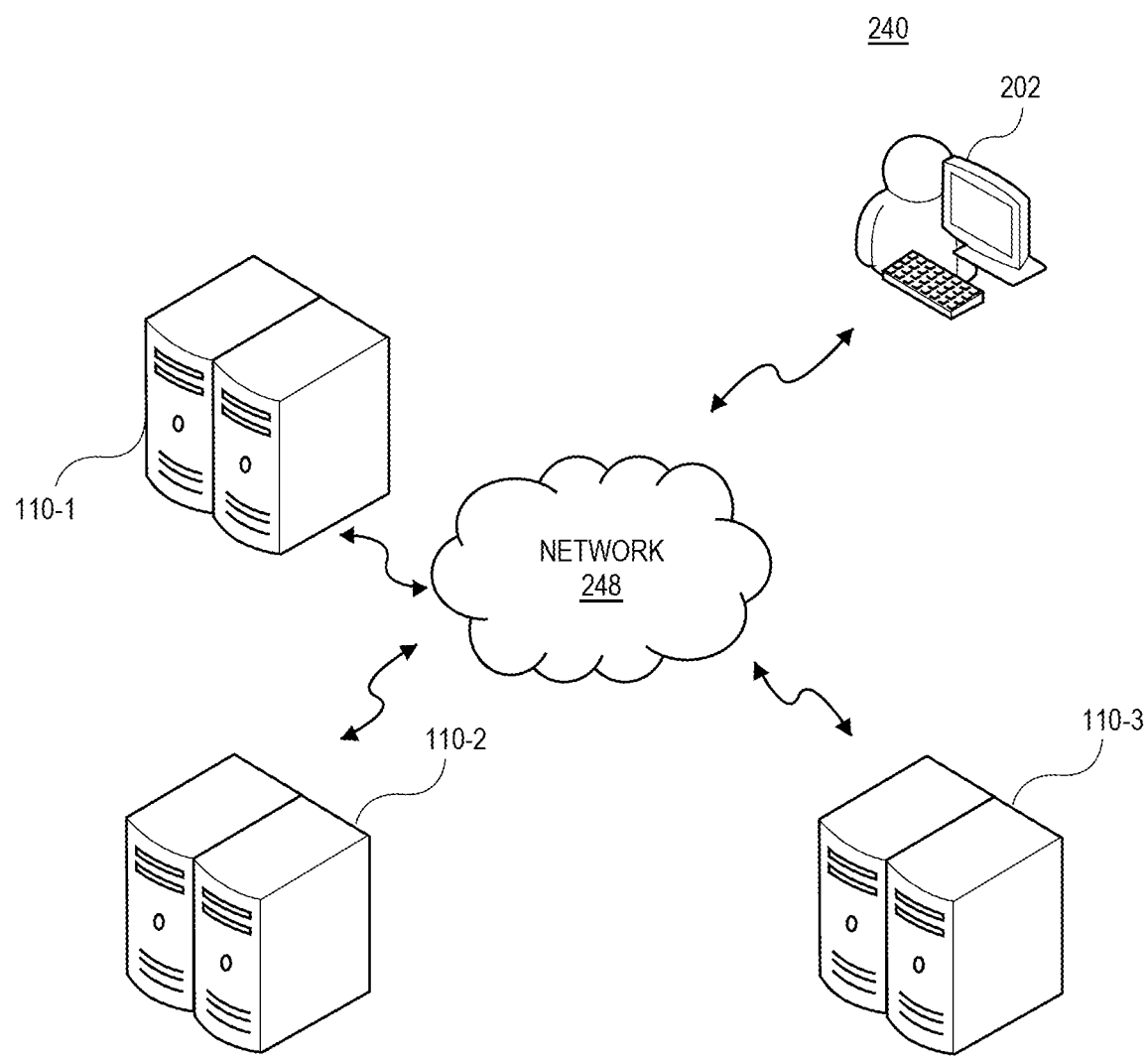

FIG. 2B shows an exemplary system 240 according to embodiments of the present disclosure. As shown in FIG. 2B, system 240 may include a distributed system of simulation systems 110-1, 110-2, and 110-3, as well as client device 202, which can all be accessed via network 248. System 240 can include any number of simulation systems 110 and can facilitate large-scale distributed simulations of robotic systems, such as a UAV. System 240 can also include any number of client devices 202 to allow users to access simulation systems 110-1, 110-2, and 110-3.

Users may access the distributed network of simulation systems 110-1, 110-2, and 110-3, via network 248, to perform simulations and code coverage assessments of source code associated with robotic systems, such as a UAV. Alternatively and/or in addition, distributed network of simulation systems 110-1, 110-2, and 110-3 can be utilized to perform automated simulations and code coverage assessments of source code associated with a robotic system, such as a UAV, in parallel.

As described herein, distributed network of simulations systems 110-1, 110-2, and 110-3 can include a code coverage mode, whereby simulations code coverage assessments can be performed while simulation testing is being performed. According to certain aspects of the present disclosure, distributed network of simulations systems 110-1, 110-2, and 110-3 can perform a large number of simulations (e.g., hundreds, thousands, tens of thousands, hundreds of thousands, or more) while employing different missions, simulated environments, test cases, etc. After the simulations have been performed, the code coverage data and/or information compiled from the simulations can be aggregated and compiled to generate one or more code coverage reports. The code coverage reports can include information on different levels of granularity (e.g., directory, file, line, branch, etc.). Exemplary code coverage reports are described further herein in connection with FIGS. 6A, 6B, and 6C.

Figure 3:
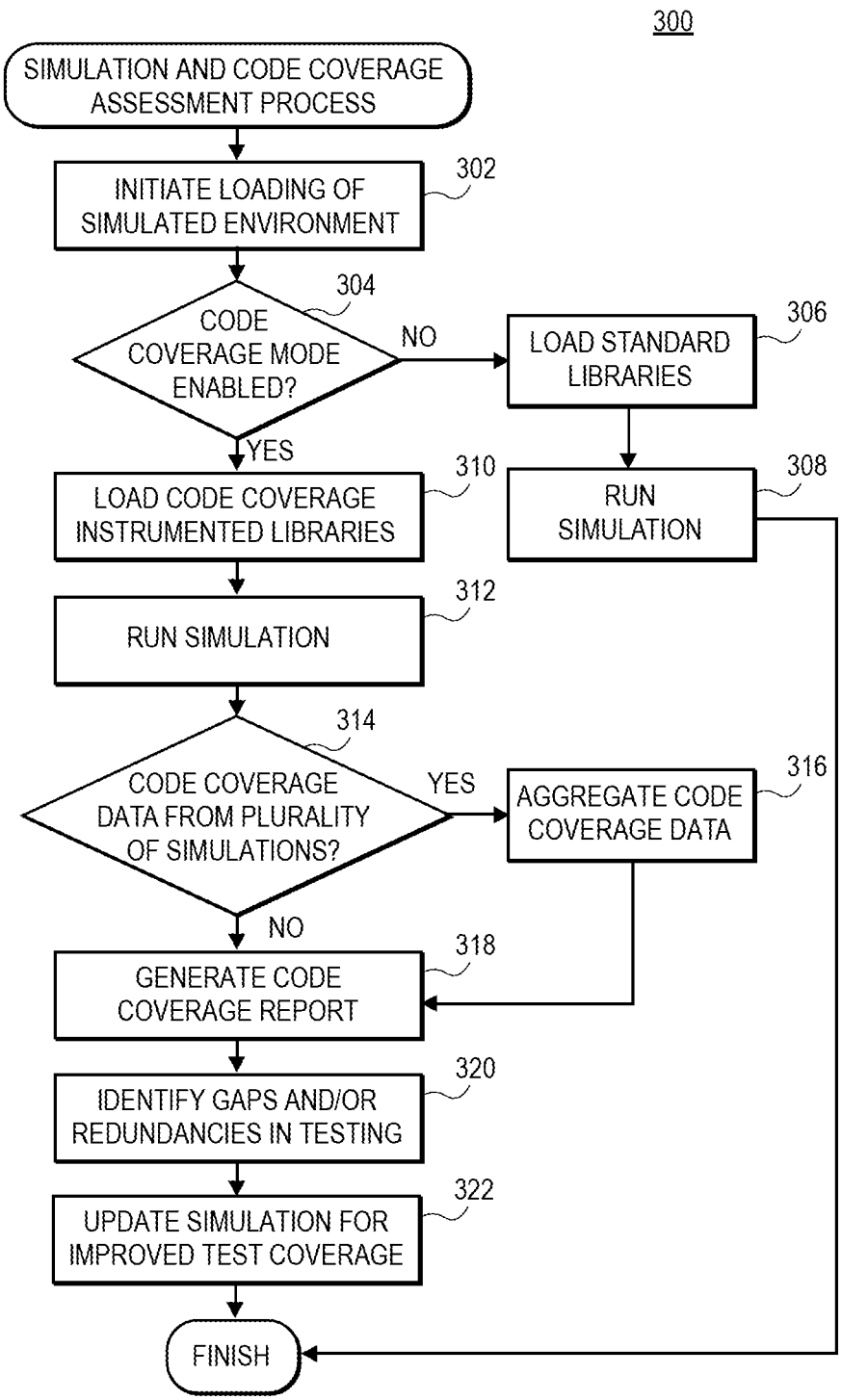
FIG. 3 is a flow diagram of an exemplary process for performing simulations and code coverage assessments, in accordance with embodiments of the present disclosure.

FIG. 3 is a flow diagram of an exemplary simulation and code coverage assessment process 300, according to embodiments of the present disclosure. As shown in FIG. 3, in step 302, loading of the simulated environment can be initiated. Next, in step 304, it can be determined whether code coverage mode has been enabled. For example, this can include a flag that can be set to instruct the simulator (e.g., simulation system 110) to run the simulation in code coverage mode. According to certain aspects, code coverage mode can be a user selected feature. Alternatively and/or in addition, code coverage mode can be automatically enabled or disabled depending on the type of test being performed. For example, certain large-scale distributed tests performed in a software release process may require code coverage mode to be enabled.

In the event that code coverage mode is disabled, the standard libraries may be loaded, as in step 306, and the simulation can be performed, as in step 308. According to certain embodiments, the simulation can provide a simulated environment in which the source code of a robotic system, such as a UAV, can be tested. For example, the simulation may provide a simulated environment for a UAV to fly simulated missions to test, verify, and validate the operation of the source code associated with the UAV. Preferably, the simulations performed are full system-wide simulations intended to comprehensively test all the algorithms and source code underpinning all the subsystems and components of the UAV.

In the event that code coverage mode is enabled, code coverage instrumented shared libraries can be loaded, as in step 310. According to certain aspects of the present disclosure, the code coverage instrumented shared libraries can be generated by the compiler at compile time to insert directives and/or objects into the software code such that the execution of each line of code can be counted and/or logged. After the code coverage instrumented shared libraries are loaded, the simulation can be performed using the code coverage instrumented shared libraries, as in step 312. Accordingly, as the simulations are being performed, a code coverage assessment is performed to determine the portions of the source code that are executed and tested during the simulations. For example, as the simulation is being performed, the inserted instrumented directives and/or objects can provide an indication which function, line, branch, etc. of the source code was indeed executed during the simulation. Next, in step 314, it can be determined whether code coverage data and/or information from more than one simulation may exist. For example, this can include code coverage data and/or information from other full-system simulations. Alternatively and/or in addition, this can include code coverage data and/or information from individual unit tests and/or hardware tests and simulations. If code coverage data and/or information from other simulations and/or tests exists, the code coverage data and/or information from the various simulations and/or tests can be aggregated and combined, as in step 316.

After the code coverage data and/or information has been aggregated, if necessary, in step 318, a code coverage report can be generated. The code coverage report can, based on the indications of which function, line, branch, etc. of the source code were indeed executed during the simulation, identify the portions of the source code that were executed during the simulations, as well as providing metrics to provide an assessment of the code coverage. For example, the code coverage reports can indicate the portions of the source code that were executed as a percentage, fraction, graphically, etc. These metrics can be presented with varying levels of granularity. For example, the percentages can be shown as an overall percentage of the source code executed by directory, file, function, line, branch, etc. Certain aspects of the present disclosure can also provide an overall code coverage score, so as to quantify the overall code coverage as a single quantifiable value. Additionally, the code coverage reports can facilitate identification of gaps in the testing and simulation of the source code. For example, code coverage reports can indicate which portions of source code were and/or were not executed or run by the simulations performed in the simulated environment. This can indicate where gaps in test coverage may exist and can facilitate more comprehensive testing of the source code by identifying additional test scenarios that may be desired to exercise and test the portions of source code that were not executed during the simulations. Additionally, the code coverage reports can include indications that certain portions of the source code not expected to be executed (e.g., deactivated code, etc.) during operation of the robotic system were indeed executed during the simulation.

Based on the code coverage report, gaps and/or redundancies in the test coverage can be identified, as in step 320. For example, the code coverage report can provide insights as to which portions of the source code are and are not being executed during the simulations. Accordingly, additional test coverage may be desirable for the portions of the code that are not being executed during the simulations. Conversely, redundancies and overlap in the test coverage can also be identified in the code coverage reports. For example, comparing code coverage reports for a plurality of simulations can reveal that multiple test cases are testing and exercising the same portion of code repeatedly, and it may be desirable to eliminate at least some of these redundancies to improve the efficiency of the testing. Based on any identified gaps and/or redundancies, the simulations can be modified to adjust the test coverage to address the gaps and/or eliminate the redundancies, as in step 322.

Figure 4:
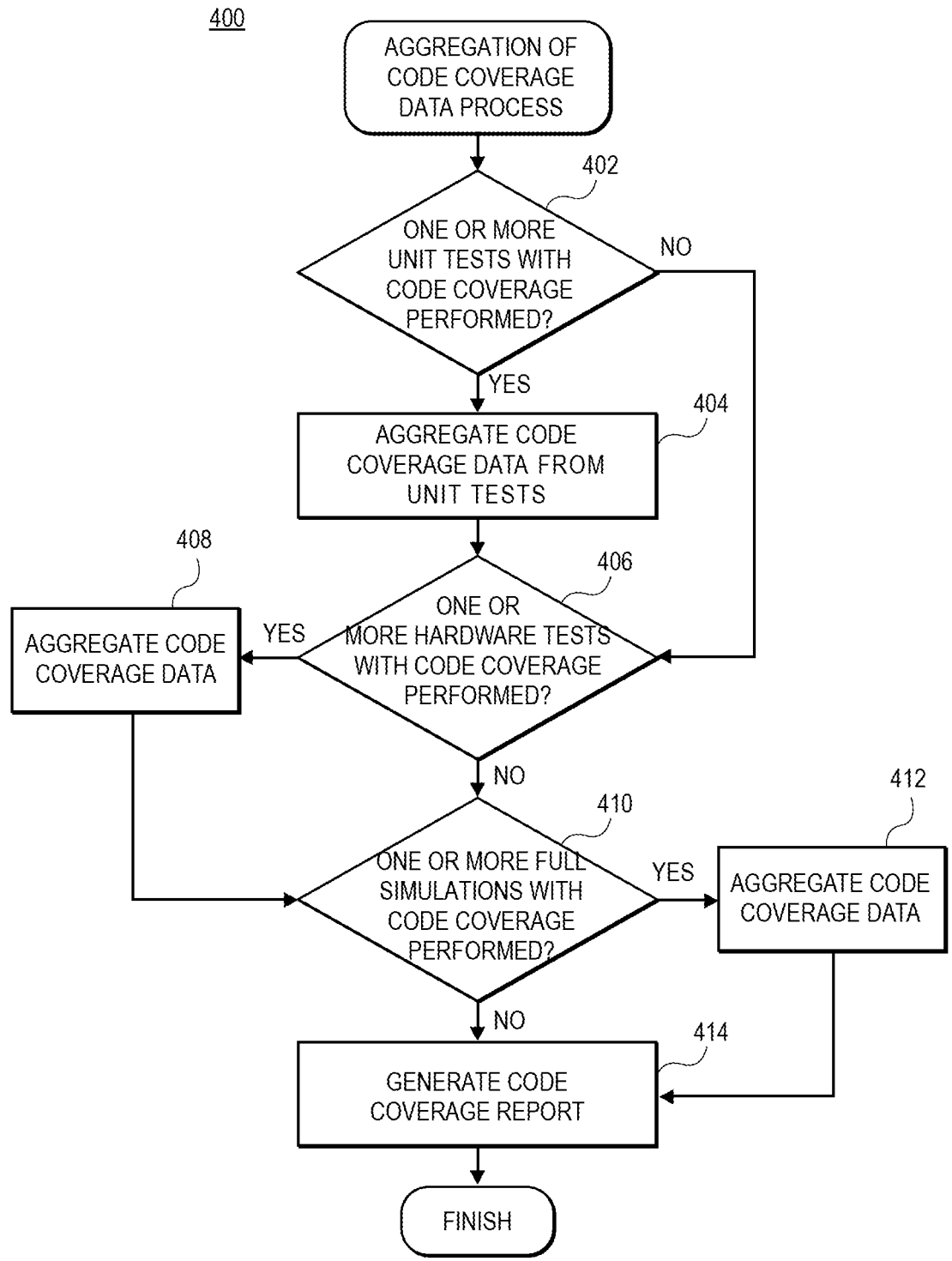
FIG. 4 is a flow diagram illustrating an exemplary process for aggregating code coverage data, in accordance with embodiments of the present disclosure.

FIG. 4 is a flow diagram of an exemplary code coverage data and/or information aggregation process 400, according to embodiments of the present disclosure. According to certain aspects of the present disclosure exemplary process 400 may be performed in step 316 of exemplary process 300, where code coverage data and/or information may be aggregated in preparation for generating a code coverage report.

As shown in FIG. 4, in aggregating the code coverage data and/or information, it can first be determined whether code coverage data and/or information from one or more unit tests exists, as in step 402. If such data and/or information exists, the code coverage data and/or information from the unit tests is aggregated in step 404. In step 406, it can then be determined whether one or more hardware tests and/or simulations were performed with code coverage. If such tests and/or simulations were performed, in step 408, the code coverage data and/or information can be aggregated together, as well as being aggregated with any code coverage data and/or information from any unit tests.

Next, it can be determined whether code coverage data and/or information was obtained from full system simulations, as in step 410. In the event that code coverage data and/or information from one or more full simulations exists, in step 412, the code coverage data and/or information can be aggregated together, as well as being aggregated with any code coverage data and/or information generated from the unit tests and/or the hardware tests and simulations. After the code coverage data and/or information has been aggregated, a code coverage report can be generated as in step 414.

Aspects of the present disclosure contemplate other processes for the aggregation of code coverage data and/or information. For example, the code coverage data and/or information generated by full simulations may first be aggregated prior to aggregating code coverage data and/or information from unit tests. Alternatively, only code coverage data and/or information generated by full simulations and code coverage data and/or information from unit tests may be excluded, or vice versa. Moreover, code coverage data and/or information from certain unit tests and/or full simulations may be selectively chosen to be aggregated.

Figure 5:
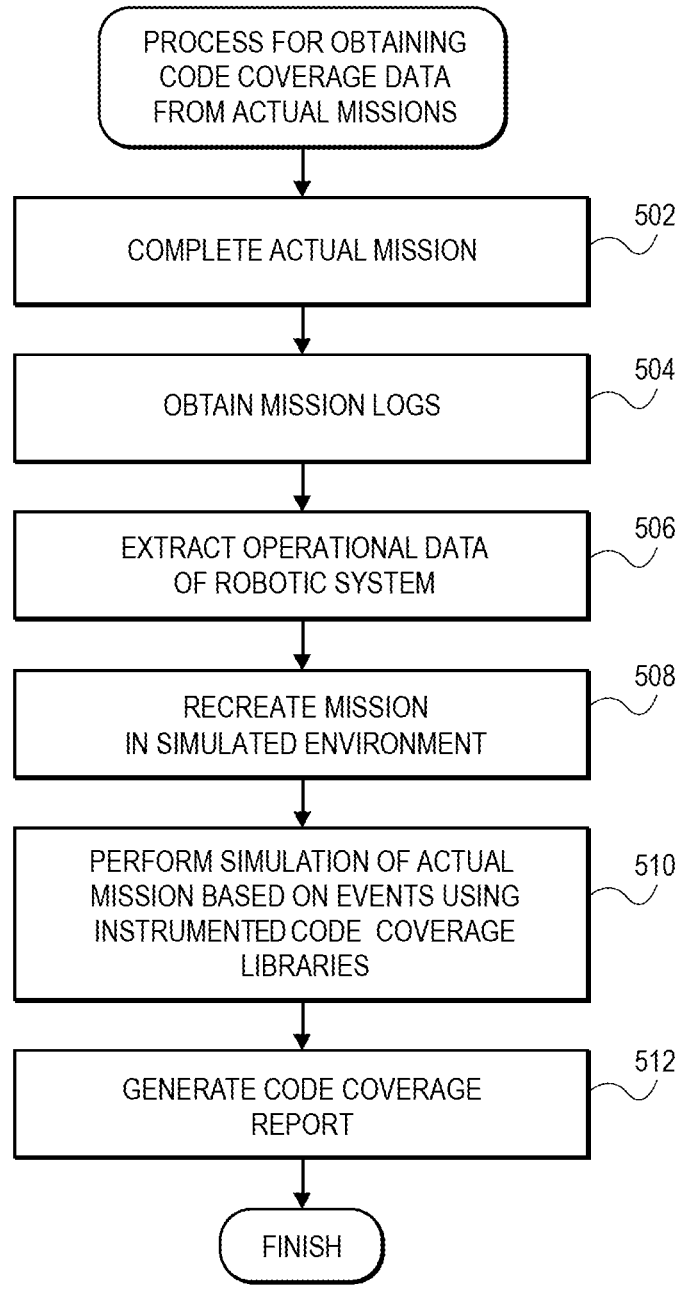
FIG. 5 is a flow diagram illustrating an exemplary process for performing a code coverage assessment, in accordance with embodiments of the present disclosure.

FIG. 5 is a flow diagram of an exemplary process 500 for obtaining code coverage data and/or information in connection with an actual real-world operation of a robotic system, such as a UAV. For example, exemplary process 500 may facilitate obtaining code coverage data and/or information in connection with an actual flight and/or mission performed by a UAV.

As shown in FIG. 5, an actual mission of a robotic system, such as a UAV, may be completed in step 502. After the mission has been completed, the logs (e.g., flight logs, etc.) from the robotic system may be obtained in step 504. The logs may include detailed information associated with the real-world mission that was completed in step 502. For example, the log can include each and every event encountered by the robotic system during the actual real-world mission, including any associated inputs, commands, instructions, etc. received and/or executed by the robotic system. Next, the operational data and/or information associated with the actual real-world mission can be extracted in step 506.

The extracted operational data and/or information can then be used to recreate the mission of the robotic system in a simulated environment, as in step 508, and in step 510, the code coverage instrumented shared libraries can be loaded and a simulation of the recreation of the actual real-world mission can be performed. For example, the simulation of the recreation of the actual real-world mission can include each and every event that was encountered during the action real-world mission. Accordingly, as the simulation is being performed, the code coverage instrumented shared libraries facilitate making a determination as to which portions (e.g., on a directory level, on a file level, on a function level, on a branch level, on a line level, etc.) of the source code were executed during the simulation of the actual real-world mission. This can provide insights into the code coverage of the source code during an actual mission (e.g., flight, etc.) of a robotic system, such as a UAV.

According to certain aspects of the present disclosure, code coverage reports can be generated from a plurality of reconstructed actual flights. For example, flight logs, data, and/or other information associated with an actual flight of a UAV can be extracted for a plurality of actual flights. In certain implementations, the extraction of flight logs, data, and/or information can be automatically performed at the completion of each flight of one or more UAVs (e.g., for a fleet of UAVs, etc.), and the extracted flight logs, data, and/or information from the various flights can be used to reconstruct the flights performed by the UAVs. Accordingly, code coverage assessments can be performed as the recreated flights are simulated, so as to obtain code coverage data and/or information in connection with each of the reconstructed flights. The code coverage data and/or information obtained from the various simulated reconstructed flights can be aggregated and the aggregated code coverage data and/or information can be used to generate one or more code coverage reports associated with the reconstructed flights.

Then, in step 512, a code coverage report can be generated based on the code coverage data and/or information obtained during the simulation. Based on the code coverage report, gaps and/or redundancies in the test coverage can be identified. For example, the code coverage report can provide insights as to which portions of the source code are and are not being executed during the simulations. Accordingly, additional test coverage may be desirable for the portions of the code that are not being executed during the simulations. Conversely, redundancies and overlap in the test coverage can also be identified in the code coverage reports. For example, comparing code coverage reports for a plurality of simulations can reveal that multiple test cases are testing and exercising the same portion of code repeatedly, and it may be desirable to eliminate at least some of these redundancies to improve the efficiency of the testing. Based on any identified gaps and/or redundancies, the simulations can be modified to adjust the test coverage to address the gaps and/or eliminate the redundancies. Additionally, the code coverage reports can include indications that certain portions of the source code not expected to be executed (e.g., deactivated code, etc.) during operation of the robotic system were indeed executed during the simulation.

Figure 6A:
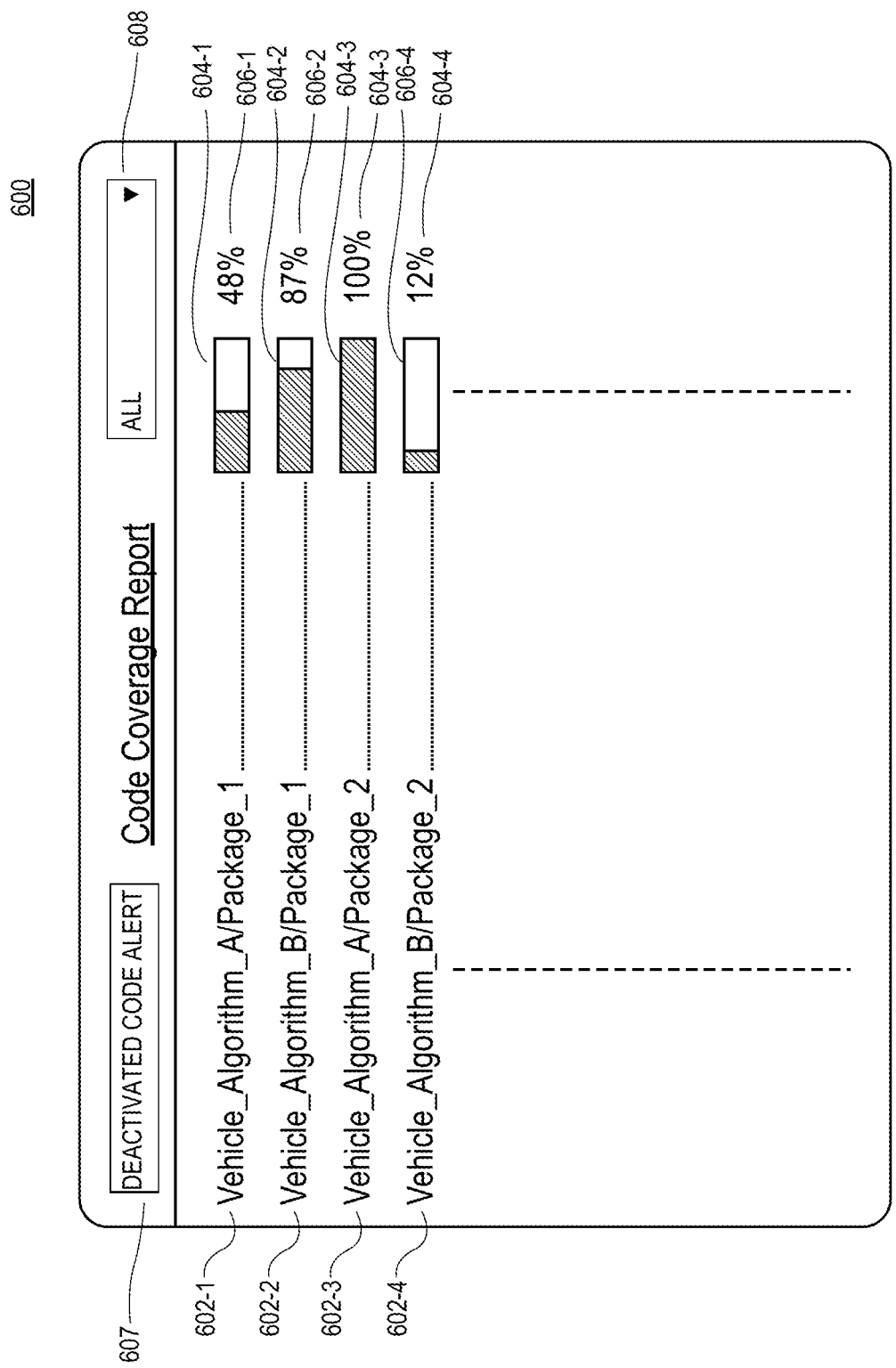
FIGS. 6A, 6B, and 6C are illustrations of exemplary presentations of code coverage reports, in accordance with embodiments of the present disclosure.
Figure 6B:
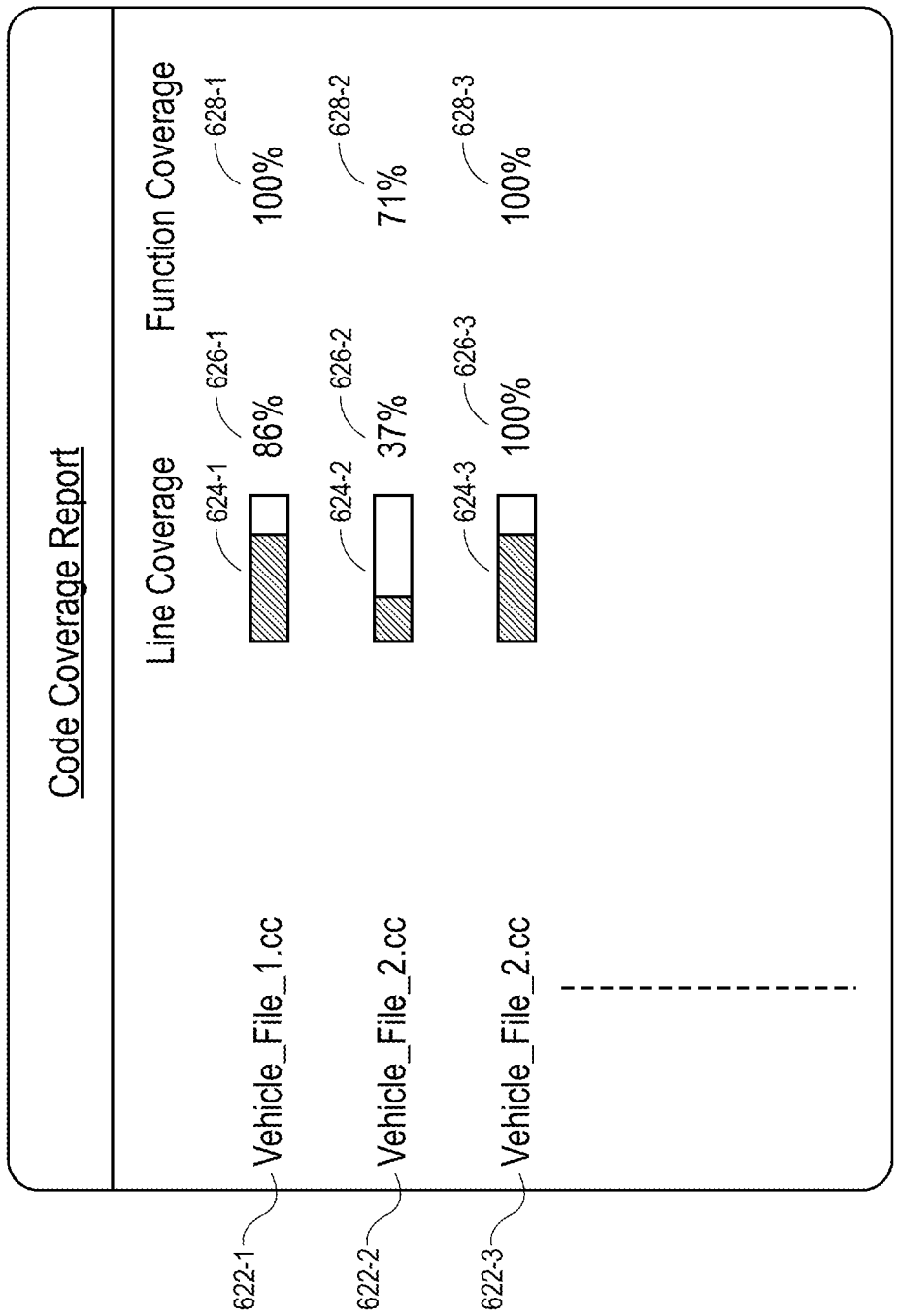
Figure 6C:
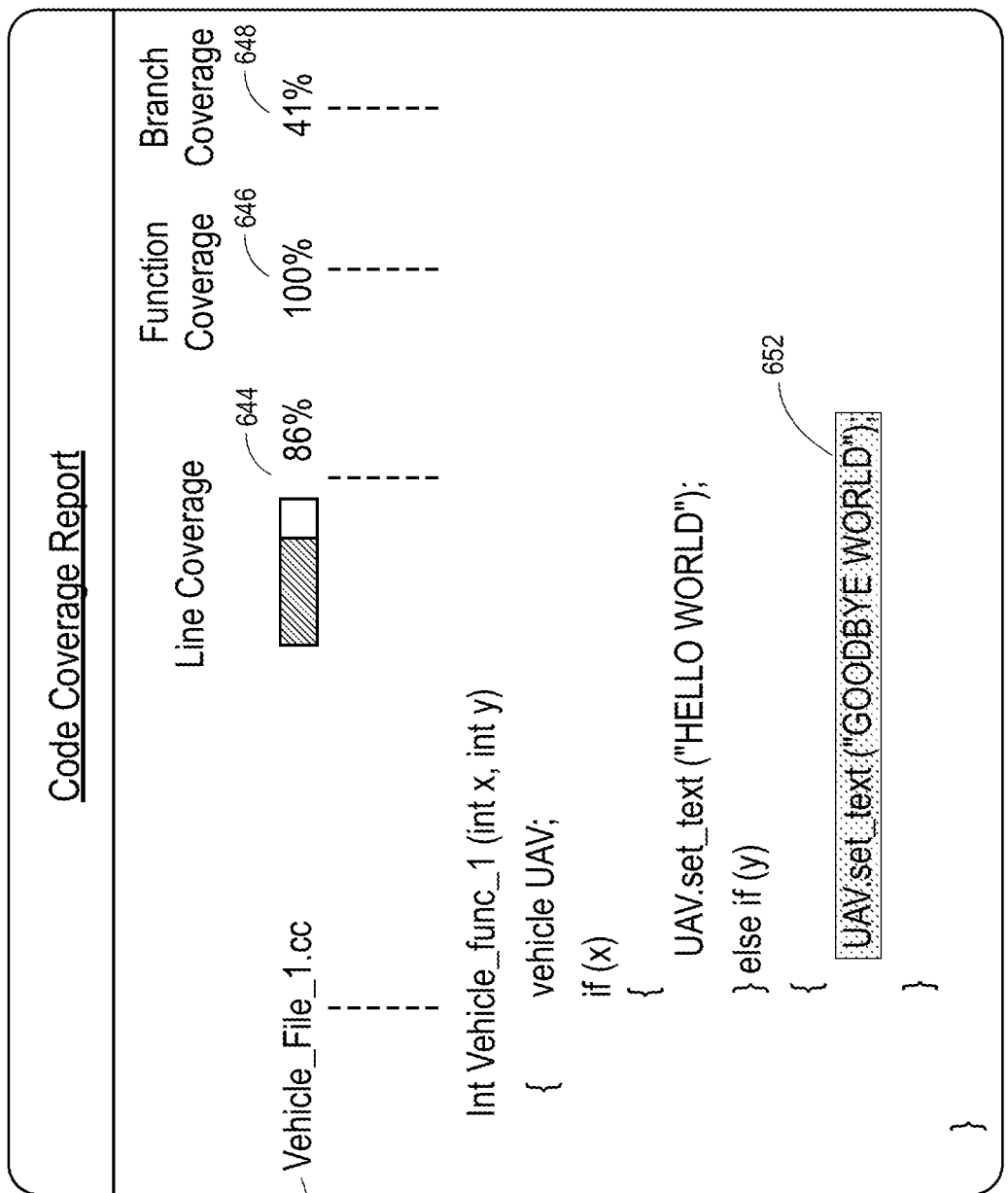

FIGS. 6A, 6B, and 6C are illustrations of exemplary presentations 600, 620, and 640, respectively, of a code coverage report. One or more of presentations 600, 620, and 640 of the respective code coverage reports can be generated based on the code coverage data and/or information obtained while running simulations using the code coverage instrumented shared libraries. Presentations 600, 620, and 640 are merely exemplary and the code coverage reports can be presented in any format, orientation, etc. without departing from the exemplary embodiments of the present disclosure.

As shown in FIG. 6A, presentation 600 of a code coverage report displays the code coverage, i.e., the portion of the code that was executed, on a directory level basis. The directories 602-1, 602-2, 602-3, and 602-4 that were included in the code coverage assessment, and therefore are being summarized in the code coverage report, are listed on a left side portion of presentation 600, and the respective code coverage assessment for each directory can be provided on a right side portion of presentation 600. For example, the code coverage assessment can be provided as a percentage of the portion of each directory 602-1, 602-2, 602-3, and 602-4 that was executed during the simulations. This can represent a percentage of the lines of code in the directory that was executed. Alternatively, this can include a percentage of the number of functions in the directory that were executed during the simulation, or any other by which the code coverage can be assessed.

As shown in FIG. 6A, presentation 600 of the code coverage report can also include deactivated code alert 607 and filtering input 608. Deactivated code alert 607 can be an indication that one or more portions of the code that were not expected to have been executed (e.g., deactivated code, etc.) was indeed executed during the simulation. The code coverage reports can also include indications identifying the location (e.g., directory, file, function, etc.) of the deactivated code that was indeed executed during the simulation. Additionally, filtering input 608 can facilitate filtering of the aggregated code coverage data and/or information used to generate the code coverage report. For example, a user may select ALL to view the code coverage report based on an aggregation of all the code coverage data and/or information from all the full system simulations, unit tests, hardware test, etc. that were performed for which code coverage data and/or information is available. Alternatively and/or in addition, filtering input 608 may allow a user to limit the information provided to one or more full system simulations. Similarly, filtering input 608 may allow a user to limit the information provided to one or more unit tests, or one or more hardware tests, etc. Presentation 600 of the code coverage report may also include other filtering options (e.g., specific full system simulations, unit tests, hardware tests, specific test cases in the various tests, tests where deactivated code was executed, etc.) such that the user may customize and restrict the presented information to focus on certain information presented in the code coverage report.

According to certain aspects, the code coverage assessment can include numerical values 606-1, 606-2, 606-3, and 606-4, as well as graphical representations 604-1, 604-2, 604-3, and 604-4. The code coverage assessment can also be color coded to facilitate rapid consumption of the information. For example, a high code coverage assessment with a code coverage percentage above a certain threshold (e.g., 95%, 90%, 85%, etc.) for a given directory may be color coded in green, a low code coverage assessment with a code coverage percentage below a certain threshold (e.g., 70%, 65%, 60%, 55%, 50%, or any other value) for a given directory may be color coded in red, and an acceptable code coverage assessment with a code coverage assessment between the thresholds for a high code coverage assessment and a low code coverage assessment may be color coded in yellow.

According to embodiments of the present disclosure, presentation 600 of the code coverage report can include any number of directories tested during the simulations and for which a code coverage assessment was performed. Optionally, an overall code coverage score for the source code overall can also be provided. This can include a single percentage value indicating the percentage of the source code that was executed. Alternatively, the overall code coverage score can include a weighted average of the code coverage assessments for the various directories, where more important directories, functions, etc. are provided a higher weight. Further, determination of the overall code coverage score can be modified if certain code coverage data and/or information is desired to be emphasized (e.g., number of lines executed, number of branches executed, number of functions executed, code coverage associated with specific subsystems and/or components of the robotic system, etc.). Other statistical analysis and algorithms can also be applied to obtain an overall code coverage score that can facilitate quantifying the code coverage as a single discrete value.

FIG. 6B is an illustration of presentation 620 of another exemplary code coverage report, according to embodiments of the present disclosure. As shown in FIG. 6B, presentation 620 of a code coverage report displays the code coverage, i.e., the portion of the code that was executed, on a file level basis. The files 622-1, 622-2, and 622-3 that were included in the code coverage assessment, and therefore being summarized in the code coverage report, are listed on a left side portion of presentation 620, and the respective code coverage assessments for each file can be provided on a right side portion of presentation 620.

As shown in FIG. 6B, the code coverage assessment for each file 622-1, 622-2, and 622-3 can be provided as one or more percentages indicating the portion of each file 622-1, 622-2, and 622-3 that was executed during the simulations. This can include, for example, representing the code coverage of the file as line coverage values 626-1, 626-2, and 626-3, which can represent the percentage of the total number lines in each file that were executed. Alternatively and/or in addition, the code coverage can be represented as function coverage values 628-1, 628-2, and 628-3, which can represent the percentage of the total number of functions in each file that were executed. According to certain aspects, graphical representations 624-1, 624-2, and 624-3 may be provided for the line coverage values, the function coverage value, or both. According to embodiments of the present disclosure, presentation 620 of the code coverage report can include any number of files tested during the simulations and for which a code coverage assessment was performed. Optionally, an overall code coverage score for the source code overall can also be provided.

The code coverage assessment can also be color coded to facilitate rapid consumption of the information. For example, a high code coverage assessment with a code coverage percentage above a certain threshold (e.g., 95%, 90%, 85%, etc.) for a given directory may be color coded in green, a low code coverage assessment with a code coverage percentage below a certain threshold (e.g., 70%, 65%, 60%, 55%, 50%, or any other value) for a given directory may be color coded in red, and an acceptable code coverage assessment with a code coverage assessment between the thresholds for a high code coverage assessment and a low code coverage assessment may be color coded in yellow.

FIG. 6C is an illustration of presentation 640 of another exemplary code coverage report, according to embodiments of the present disclosure. As shown in FIG. 6C, presentation 640 of a code coverage report displays the code coverage, i.e., the portion of the code that was executed, on a file level basis, along with a line-by-line coverage report showing which lines of the actual lines of code were executed during the simulation.

In FIG. 6C, presentation 640 of the code coverage report shows the code coverage assessment for file 642. As shown in FIG. 6C, the code coverage assessment for file 642 includes line coverage assessment 644, function coverage assessment 646, as well as branch coverage assessment 648. The code coverage report shown in presentation 640 also includes line-by-line coverage report 650, which provides a representation of which lines of the software were executed during simulation of the source code.

As shown in FIG. 6C, the code coverage assessment for file 642 can be provided as one or more percentages indicating the portion of file 642 that was executed during the simulations. This can include, for example, representing the code coverage of the file as line coverage value 644, which can represent the percentage of the total number lines in each file that were executed. Alternatively and/or in addition, the code coverage can be represented as function coverage value 646, which can represent the percentage of the total number of functions in each file that were executed. Further, the code coverage can also be represented as branch coverage value 648, which can represent the percentage of the total number of branches (e.g., Boolean clauses, etc.) in each file that were executed. According to certain aspects, one or more of line coverage value 644, function coverage value 646, and/or branch coverage value 648 can be graphical representations. According to embodiments of the present disclosure, presentation 640 of the code coverage report can include any number of files tested during the simulations and for which a code coverage assessment was performed. Optionally, an overall code coverage score for the source code overall can also be provided.

The code coverage assessment can also be color coded to facilitate rapid consumption of the information. For example, a high code coverage assessment with a code coverage percentage above a certain threshold (e.g., 95%, 90%, 85%, etc.) for a given directory may be color coded in green, a low code coverage assessment with a code coverage percentage below a certain threshold (e.g., 70%, 65%, 60%, 55%, 50%, or any other value) for a given directory may be color coded in red, and an acceptable code coverage assessment with a code coverage assessment between the thresholds for a high code coverage assessment and a low code coverage assessment may be color coded in yellow.

The code coverage report shown in presentation 640 can also include line-by-line coverage report 650. For example, each line of code in file 642 can be shaded to show which lines of code were not executed during the simulation. As shown in FIG. 6C, shading 652 can represent that the line "UAV.set_text (GOODBYE WORLD')" was not executed during the simulations. Alternatively, all the lines of code can be shaded, and the lines of code that were executed can be shaded in a first color (e.g., green, blue, etc.) and the lines of code that were not executed can be shaded in a different color (e.g., red, yellow, gray, etc.). Alternatively and/or in addition, the code coverage report can include a visual indication for lines of code that were expected not to be executed (e.g. deactivated code, etc.) but were indeed executed during the simulation. For example, deactivated and executed lines of code can also be shaded and color coded to identify and provide an indication of such deactivated and executed portions of code.

Regarding the processes 300, 400, and 500 described above with respect to FIGS. 3 through 5, as well as other routines and/or processes described or suggested herein, while these routines/processes are expressed in regard to discrete steps, these steps should be viewed as being logical in nature and may or may not correspond to any specific actual and/or discrete execution steps of a given implementation. Also, the order in which these steps are presented in the various routines and processes, unless otherwise indicated, should not be construed as the only or best order in which the steps may be carried out. Moreover, in some instances, some of these steps may be combined and/or omitted. Those skilled in the art will recognize that the logical presentation of steps is sufficiently instructive to carry out aspects of the claimed subject matter irrespective of any particular development or coding language in which the logical instructions/steps are encoded.

Of course, while these routines and/or processes include various novel features of the disclosed subject matter, other steps (not listed) may also be included and carried out in the execution of the subject matter set forth in these routines, some of which have been suggested above. Those skilled in the art will appreciate that the logical steps of these routines may be combined together or be comprised of multiple steps. Steps of the above-described routines may be carried out in parallel or serially. Often, but not exclusively, the functionality of the various routines is embodied in software (e.g., applications, system services, libraries, and the like) that is executed on one or more processors of computing devices, such as the computing device described in regard to FIG. 8 below. Additionally, in various implementations, all or some of the various routines may also be embodied in executable hardware modules including, but not limited to, systems on chips (SoC's), codecs, specially designed processors and/or logic circuits, and the like.

As suggested above, these routines and/or processes are typically embodied within executable code blocks and/or modules comprising routines, functions, looping structures, selectors and switches such as if-then and if-then-else statements, assignments, arithmetic computations, and the like that, in execution, configure a computing device to operate in accordance with the routines/processes. However, the exact implementation in executable statement of each of the routines is based on various implementation configurations and decisions, including programming languages, compilers, target processors, operating environments, and the linking or binding operation. Those skilled in the art will readily appreciate that the logical steps identified in these routines may be implemented in any number of ways and, thus, the logical descriptions set forth above are sufficiently enabling to achieve similar results.

While many novel aspects of the disclosed subject matter are expressed in routines embodied within applications (also referred to as computer programs), apps (small, generally single or narrow purposed applications), and/or methods, these aspects may also be embodied as computer executable instructions stored by computer readable media, also referred to as computer readable storage media, which are articles of manufacture. As those skilled in the art will recognize, computer readable media can host, store and/or reproduce computer executable instructions and data for later retrieval and/or execution. When the computer executable instructions that are hosted or stored on the computer readable storage devices are executed by a processor of a computing device, the execution thereof causes, configures and/or adapts the executing computing device to carry out various steps, methods and/or functionality, including those steps, methods, and routines described above in regard to the various illustrated implementations. Examples of computer readable media include, but are not limited to: optical storage media such as Blu-ray discs, digital video discs (DVDs), compact discs (CDs), optical disc cartridges, and the like; magnetic storage media including hard disk drives, floppy disks, magnetic tape, and the like; memory storage devices such as random-access memory (RAM), read-only memory (ROM), memory cards, thumb drives, and the like; cloud storage (i.e., an online storage service); and the like. While computer readable media may reproduce and/or cause to deliver the computer executable instructions and data to a computing device for execution by one or more processors via various transmission means and mediums, including carrier waves and/or propagated signals, for purposes of this disclosure, computer readable media expressly excludes carrier waves and/or propagated signals.

Figure 7:
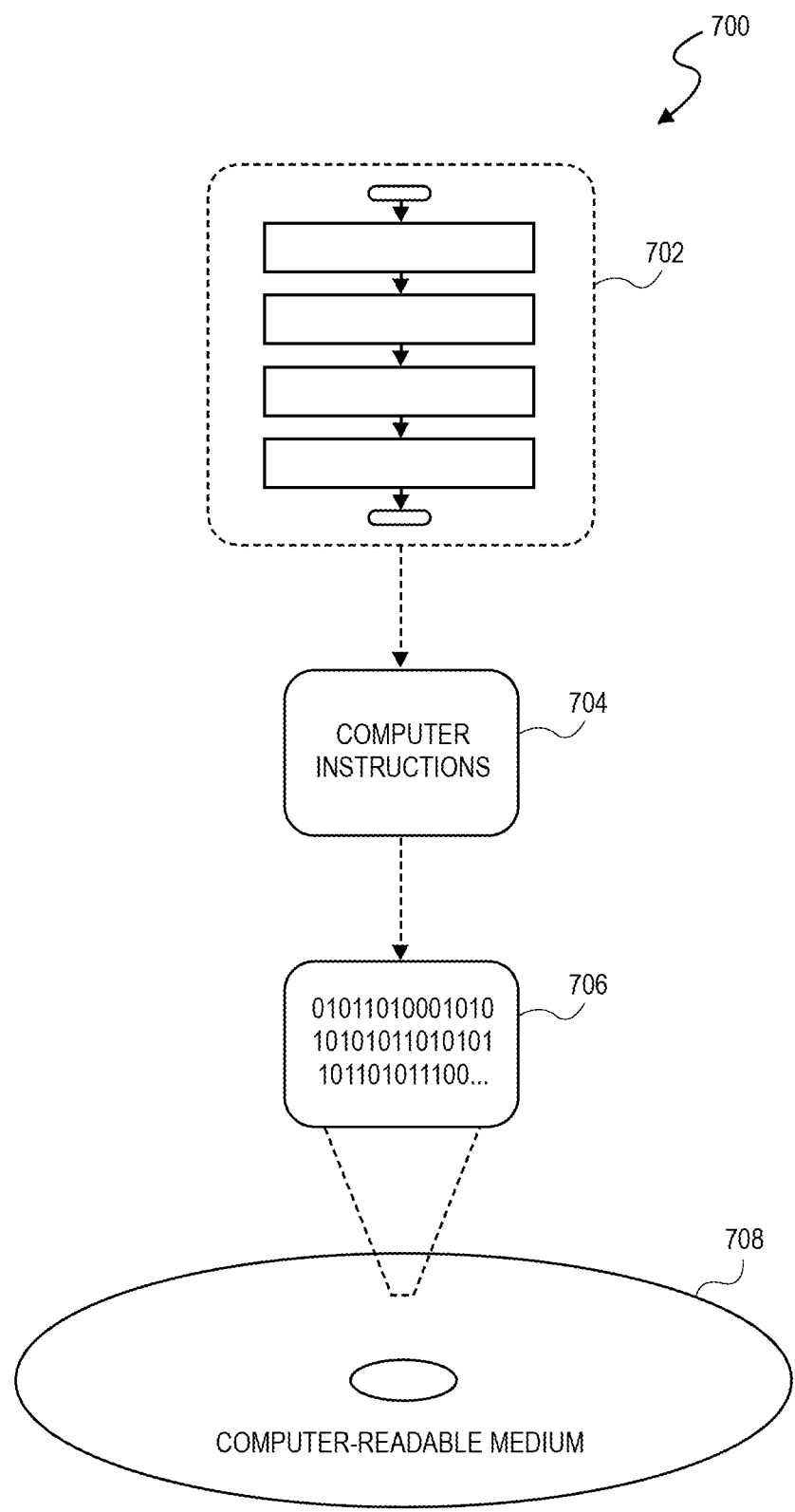
FIG. 7 is a block diagram illustrating an exemplary computer readable medium encoded with instructions, in accordance with embodiments of the present disclosure.

Regarding computer readable media, FIG. 7 is a block diagram illustrating an exemplary computer readable medium 700 encoded with instructions, as described in regard to processes 300, 400, and 500 of FIGS. 3 through 5, respectively. More particularly, the implementation can include a computer-readable medium 708 (e.g., a CD-R, DVD-R or a platter of a hard disk drive), on which is encoded computer-readable data 706. Computer-readable data 706 in turn can include a set of computer instructions 704 configured to operate according to one or more of the principles set forth herein. In one such implementation 702, processor-executable instructions 704 may be configured to perform a method, such as at least some of exemplary processes 300, 400, and 500, for example. In another such implementation, processor-executable instructions 704 may be configured to implement a system on a computing device, such as at least some of the exemplary, executable components of computing device 800 of FIG. 8, as described below. Many such computer readable media may be devised, by those of ordinary skill in the art, which are configured to operate in accordance with the implementations presented herein.

Figure 8:
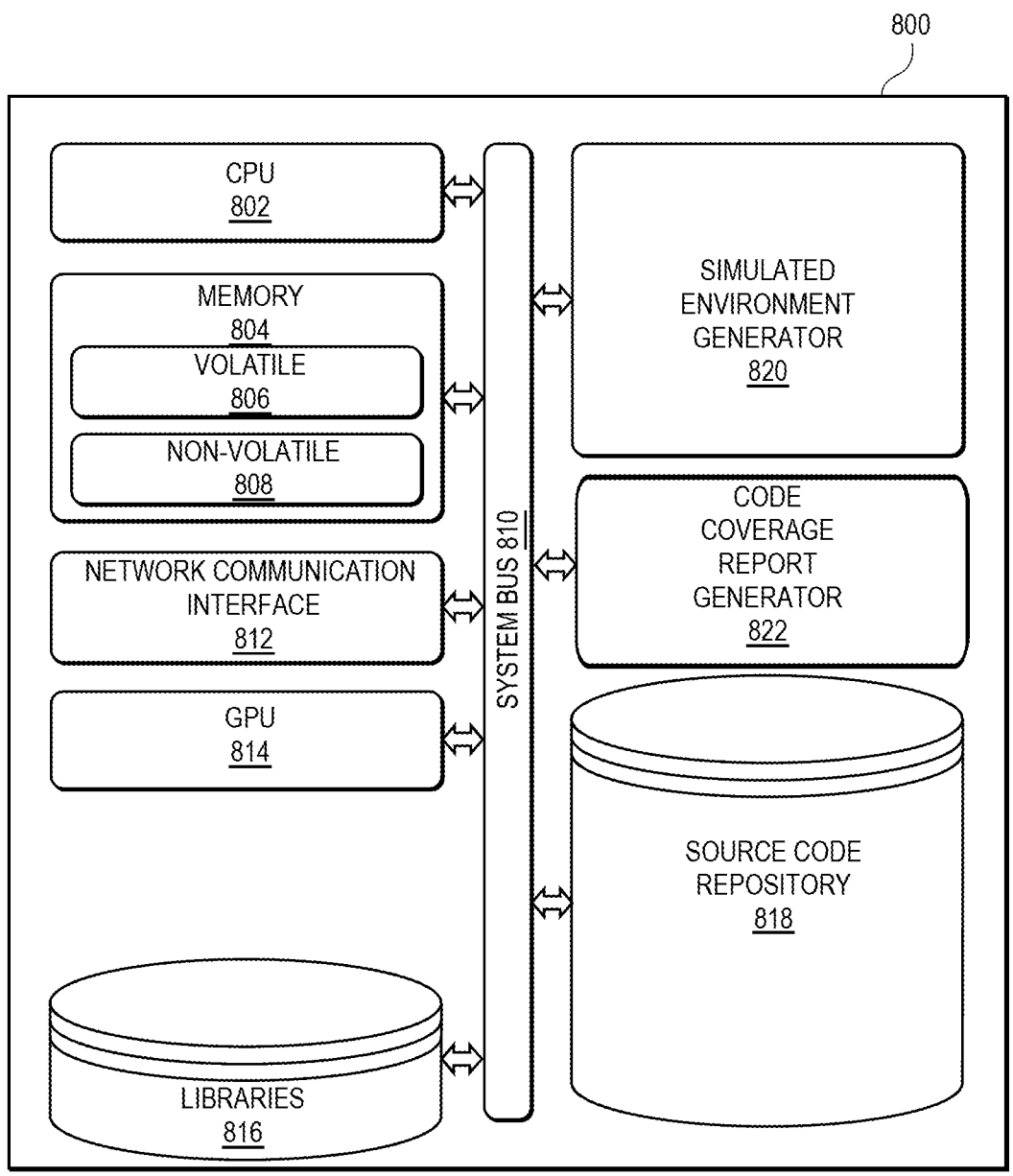
FIG. 8 is a block diagram illustrating an exemplary computing system (or computing device) configured for implementing embodiments of the present disclosure.

FIG. 8 is a block diagram illustrating an exemplary computing system 800 (or computing device) suitably configured for implementing the described implementations, such as simulation system 110. Computing system 800 typically can include one or more processors (or processing units), such as processor 802, and can further include at least one memory 804. Processor 802 and memory 804, as well as other components of the computing system, are interconnected by way of a system bus 810.

As will be appreciated by those skilled in the art, the memory 804 typically (but not always) includes both volatile memory 806 and non-volatile memory 808. Volatile memory 806 retains or stores information so long as the memory is supplied with power. In contrast, non-volatile memory 808 is capable of storing (or persisting) information even when a power supply is not available. Generally speaking, RAM and CPU cache memory are examples of volatile memory 806 whereas ROM, solid-state memory devices, memory storage devices, and/or memory cards are examples of non-volatile memory 808.

As will be further appreciated by those skilled in the art, processor 802 executes instructions retrieved from the memory 804, from computer readable media, such as computer readable media 708 of FIG. 7, and/or other executable components in carrying out the various described implementations. Processor 802 may be comprised of any of a number of available processors such as single processor, multi-processor, single-core units, and multi-core units, which are well known in the art.

Further still, the illustrated computing system 800 typically also includes a network communication interface 812 for interconnecting this computing system with other devices, computers and/or services over a computer network, such as networks 208 of FIG. 2A and 248 of FIG. 2B. The network communication interface 812, sometimes referred to as a network interface card or NIC, communicates over a network using one or more communication protocols via a physical/tangible (e.g., wired, optical fiber, etc.) connection, a wireless connection such as WiFi or Bluetooth communication protocols, NFC, or a combination thereof. As will be readily appreciated by those skilled in the art, a network communication interface, such as network communication interface 812, is typically comprised of hardware and/or firmware components (and may also include or comprise executable software components) that transmit and receive digital and/or analog signals over a transmission medium (i.e., the network).

Computing system 800 also includes a graphics processing unit (GPU) 814. As those skilled in the art will appreciate, a GPU is a specialized processing circuit designed to rapidly manipulate and alter memory. GPUs can be advantageously applied in manipulating large amounts of data, as described herein, in generating and simulating the described simulated environments and performing the simulations. One or more GPUs, such as GPU 814, can also be employed in large-scale distributed environments.

Computing system 800 further includes simulated environment generator 820. In execution on computing system 820, simulated environment generator 820 operates in a similar manner to that described herein. Indeed, simulated environment generator 820 can generate the simulated environment in which the described simulations and code coverage assessments can be performed.

Also shown in exemplary computing system 800 is code coverage report generator 822, as well as a datastore storing libraries 816, such as the standard libraries, as well as the code coverage instrumented shared libraries. Computing system 800 can also include, or be in communication with, source code repository 818. Computing system 800 may also include or be connected with one or more data stores, which can maintain any of a variety of data and/or information including, but not limited to, test scenarios, simulated environment objects, etc.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 3-5, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Those skilled in the art will appreciate that, in some embodiments, the functionality provided by the methods, systems, and apparatus discussed above may be provided in alternative ways, such as being split among more software modules or routines or consolidated into fewer modules or routines, and/or being split into additional or fewer robotic or automated units. Similarly, in some implementations, illustrated methods and systems may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that, in other implementations, the operations may be performed in other orders and in other manners. The various methods, apparatus, and systems as illustrated in the figures and described herein represent example implementations. The methods and systems may be implemented in software, hardware, or a combination thereof in other implementations. Similarly, the order of any method may be changed and various features may be added, reordered, combined, omitted, modified, etc., in other implementations.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and nodes may be implemented in firmware or hardware.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

As used throughout this application, the word "may" is used in a permissive sense (i.e., meaning having the potential to), rather than the mandatory sense (i.e., meaning must). Similarly, the words "include," "including," and "includes" mean including, but not limited to. Additionally, as used herein, the term "coupled" may refer to two or more components connected together, whether that connection is permanent (e.g., welded) or temporary (e.g., bolted), direct or indirect (e.g., through an intermediary), mechanical, chemical, optical, or electrical.

Although the invention has been described and illustrated with respect to illustrative implementations thereof, the foregoing and various other additions and omissions may be made therein and thereto without departing from the spirit and scope of the present disclosure.

What is claimed is:

1. A robotic system simulator, comprising:
    a data store storing:
        source code associated with a robotic system that is to be tested in a simulated environment; and
        a set of code coverage instrumented libraries, one or more processors;
    a memory coupled to the one or more processors and storing program instructions that, when executed by the one or more processors, cause the one or more processors to at least:
    obtain an indication to perform a code coverage assessment while performing a full system simulation of the robotic system in the simulated environment;
    perform a plurality of full system simulations of the robotic system in the simulated environment using the set of code coverage instrumented libraries;
    obtain a plurality of code coverage information, each of the plurality of code coverage information corresponding to a respective one of the plurality of full system simulations of the robotic system;
    aggregate the plurality of code coverage information to generate aggregated code coverage information; and
    generate a code coverage report based at least in part on the aggregated code coverage information.

2. The robotic system simulator of claim 1, wherein each of the plurality of code coverage information includes at least one of:
    identification of at least one executed line from the source code that was executed during the corresponding respective one of the plurality of full system simulations of the robotic system; or
    identification of at least one unexecuted line from the source code that was not executed during the corresponding respective one of the plurality of full system simulations of the robotic system.

3. The robotic system simulator of claim 1, wherein the program instructions, when executed by the one or more processors, further cause the one or more processors to at least:
    obtain second code coverage information associated with at least one of a unit test or a hardware test performed in connection with at least a portion of the source code associated with the robotic system;
    aggregate the aggregated code coverage information with the second code coverage information to form a second aggregated code coverage information; and
    generate the code coverage report based at least in part on the second aggregated code coverage information.

4. The robotic system simulator of claim 1, wherein the set of code coverage instrumented libraries includes objects inserted by a compiler to facilitate generation of the plurality of code coverage information.

5. A computer implemented method, comprising:
    obtaining a set of code coverage instrumented libraries;
    performing a full system simulation of a vehicle in a simulated environment while utilizing the set of code coverage instrumented libraries;
    obtaining code coverage information in connection with a source code associated with the vehicle and generated during the full system simulation of the vehicle; and
    generating a code coverage report based at least in part on the code coverage information.

6. The method of claim 5, wherein obtaining the code coverage information includes, at least:
    identifying at least one portion of the source code associated with the vehicle that was not executed during the full system simulation of the vehicle; and
    identifying at least one second portion of the source code associated with the vehicle that was executed during the full system simulation of the vehicle.

7. The method of claim 5, wherein the code coverage report includes a representation of the source code and a visual representation indicating at least a portion of the source code that was not executed during the full system simulation of the vehicle.

8. The method of claim 5, wherein the code coverage report includes at least one of:
   an indication that a deactivated portion of the source code was executed during the full system simulation of the vehicle;
   an overall coverage value representing a portion of the source code that was executed during the full system simulation of the vehicle;
   a directory coverage value representing a portion of a respective directory of the source code that was executed during the full system simulation of the vehicle; or
   a file coverage value representing a portion of a respective file of the source code that was executed during the full system simulation of the vehicle.

9. The method of claim 8, wherein the file coverage value includes at least one of:
   a function coverage value representing a portion of functions of the respective file that was executed during the full system simulation of the vehicle;
   a line coverage value representing a portion of lines of the respective file that was executed during the full system simulation of the vehicle; or
   a branch coverage value representing a portion of branches of the respective file that was executed during the full system simulation of the vehicle.

10. The method of claim 5, further comprising:
    obtaining flight information corresponding to an actual flight of the vehicle,
    wherein performing the full system simulation of the vehicle in the simulated environment is based at least in part on the flight information such that the actual flight of the vehicle is reconstructed in the simulated environment during the full system simulation.

11. The method of claim 5, further comprising:
    obtaining second code coverage information associated with a unit test performed in connection with at least a portion of the source code associated with the vehicle; and
    aggregating the code coverage information with the second code coverage information to form aggregated code coverage information,
    wherein the code coverage report is generated based at least in part on the aggregated code coverage information.

12. The method of claim 5, further comprising:
    performing a plurality of full system simulations of the vehicle;
    obtaining a plurality of second code coverage information, each of the plurality of second code coverage information corresponding to a respective one of the plurality of full system simulations of the vehicle; and
    aggregating the plurality of second code coverage information to form aggregated code coverage information,
    wherein the code coverage report is generated based at least in part on the aggregated code coverage information.

13. The method of claim 12, wherein the plurality of full system simulations of the vehicle are performed in parallel.

14. The method of claim 5, further comprising:
    identifying a gap in the full system simulation of the vehicle based at least in part on the code coverage information or the code coverage report; and
    updating the full system simulation to include test coverage for the gap.

15. The method of claim 5, further comprising:
    identifying a redundancy in the full system simulation of the vehicle based at least in part on the code coverage information or the code coverage report; and
    updating the full system simulation to modify test coverage to eliminate the redundancy.

16. The method of claim 5, wherein the set of code coverage instrumented libraries includes objects inserted by a compiler to facilitate generation of the code coverage information.

17. A computing system, comprising:
    a memory coupled to one or more processors and storing program instructions that, when executed by the one or more processors, cause the one or more processors to at least:
       determine that a flag is enabled indicating that a full system simulation of an unmanned aerial vehicle (UAV) is to be performed in code coverage mode;
       load a set of code coverage instrumented libraries;
       perform the full system simulation of the UAV using the set of code coverage instrumented libraries;
       obtain code coverage information during the full system simulation of the UAV, the code coverage information identifying at least a portion of a source code associated with the UAV that was not executed during the full system simulation of the UAV;
       generate a code coverage report based at least in part on the code coverage information; and
       send, for presentation on a display, the code coverage report.

18. The computing system of claim 17, wherein the code coverage report includes at least one of:
    an indication that a deactivated portion of the source code was executed during the full system simulation of the UAV;
    a representation of the source code and a visual representation indicating at least a portion of the source code that was not executed during the full system simulation of the UAV;
    an overall coverage value representing a portion of the source code that was executed during the full system simulation of the UAV;
    a directory coverage value representing a portion of a respective directory of the source code that was executed during the full system simulation of the UAV;
    a file coverage value representing a portion of a respective file of the source code that was executed during the full system simulation of the UAV;
    a function coverage value representing a portion of functions of the respective file that was executed during the full system simulation of the UAV;
    a line coverage value representing a portion of lines of the respective file that was executed during the full system simulation of the UAV; or
    a branch coverage value representing a portion of branches of the respective file that was executed during the full system simulation of the UAV.

19. The computing system of claim 17, wherein the full system simulation of the UAV is updated, based at least in part on the code coverage report, to at least one of:
    include test coverage for a testing gap identified by the code coverage report; or
    eliminate a testing redundancy identified by the code coverage report.

20. The computing system of claim 17, wherein the program instructions, when executed by the one or more processors, further cause the one or more processors to at least:
- obtain second code coverage information associated with a unit test performed in connection with at least a portion of the source code associated with the UAV;
- obtain a plurality of third code coverage information associated with a plurality of full system simulations of the UAV; and
- aggregate the code coverage information, the second code coverage information, and the plurality of third code coverage information to form aggregated code coverage information,
- wherein the code coverage report is generated based at least in part on the aggregated code coverage information.

* * * * *